US005502806A

United States Patent [19]

Mahoney et al.

[11] Patent Number: 5,502,806

[45] Date of Patent: Mar. 26, 1996

[54] WAITING LINE MANAGEMENT SYSTEM

[76] Inventors: Timothy S. Mahoney, 2278 Calle Riscoso, Thousand Oaks, Calif. 91362; Michael V. Ragsdale, 31264 La Baya Dr., Westlake Village, Calif. 91362

[21] Appl. No.: 341,630

[22] Filed: Nov. 17, 1994

[51] Int. Cl.[6] .................... G06F 15/82

[52] U.S. Cl. .................... 395/161; 364/407; 235/382

[58] Field of Search .................... 395/155, 156, 395/157, 159, 161; 364/407, 410; 235/375, 376, 377, 380, 381, 382, 382.5

[56] References Cited

U.S. PATENT DOCUMENTS

| | | | |
|---|---|---|---|
| 3,893,097 | 7/1975 | Lach et al. | 340/286 |
| 4,086,475 | 4/1978 | Churchill | 235/382 |
| 4,247,759 | 1/1981 | Yuris et al. | 235/381 |
| 4,398,257 | 8/1983 | Paganini et al. | 364/550 |
| 4,538,056 | 8/1985 | Young et al. | 235/377 |
| 4,802,218 | 1/1989 | Wright et al. | 380/23 |
| 4,889,981 | 12/1989 | Harbers, Jr. | 235/490 |
| 5,006,983 | 4/1991 | Wayne et al. | 364/401 |
| 5,429,361 | 7/1995 | Raven et al. | 273/138 |

*Primary Examiner*—Mark R. Powell
*Assistant Examiner*—Ba Huynh
*Attorney, Agent, or Firm*—Jack C. Munro

[57] ABSTRACT

A waiting line management system that can be applied in any setting where usage demand exceeds the capacity for any attraction (ride, event, concert, food service outlet or any other type of entertainment, product or service) which results in a waiting period in a queue for human patrons to receive delivery of the desired entertainment, product or service. The system is activated by means of a card or electronic identification device which is issued to certain patrons and by which the patrons shall be permitted use of a plurality of computer access terminals. Using the card at these terminals, the card carrying patron can select various choices and be advised of time slot windows available to utilize attractions as well as perform other functions such as confirm or change existing selections, communicate with other card patrons, summon emergency aid, and providing for cashless monetary payment for goods and services. During the selected time slot window for an attraction, the patron must be present at the attraction and use the card to gain access by entering through a turnstile equipped with a card reader into a specially designated area. These patrons then proceed through an access gate to utilize their selected attraction. Based on a computation incorporating capacity, demand and confirmed time slot window selections, the access gates merge card patrons with non-card patrons awaiting the use of the attraction.

6 Claims, 4 Drawing Sheets

WAITING LINE MANAGEMENT SYSTEM

BACKGROUND OF THE INVENTION

1) Field of the Invention

The field of this invention relates to a waiting line management system which is designed to minimize the waiting time of humans in any situation where the current demand for the delivery of a service or admission to a facility exceeds the current capacity. As an example, the waiting line management system of this invention refers to minimizing the waiting period for the use of attractions such as rides, events, concerts, food service or other services within theme parks.

2) Description of the Prior Art

The subject matter of this invention is being discussed primarily in relation to theme parks. However, it is considered to be within the scope of this invention that it could be utilized in conjunction with any entertainment, product or service that is being utilized by a plurality of humans that requires a waiting line for the humans to partake of that entertainment, product or service.

Theme parks are a common form of entertainment for humans. Theme parks typically have a plurality of waiting lines. Included within theme parks are different types of attractions such as amusement rides, theatrical shows, and food and beverage services, all of which are designed to service the entertainment interests of a large number of humans within a limited period of time. Each attraction within a theme park has a rated capacity which reflects the number of people that can be accommodated in a fixed period of time. Most attractions within a theme park offer a unique and/or exciting experience to a group of patrons for a limited period of time, after which time it is repeated for different patrons. Each of these repetitions of the same experience is referred to herein as a cycle, which, when combined with the number of spaces or places available, is used as the basis for determining the number of people in a fixed period of time that could potentially use the attraction. When this capacity is exceeded by demand, patrons must await for the next available opening thereby resulting in long waiting lines. One problem within theme parks is that patrons become frustrated because of the seemingly endless series of long waiting lines in order to access major attractions within the theme park.

Within theme parks, the patrons are offered spending opportunities to purchase merchandise, as well as food and beverage items. Patrons currently spend more than 50% of their time standing in a waiting line waiting for different attractions. This means that at least 50% of the time the patrons are not able to make purchases of merchandise, food and beverages. As a result the theme park loses significant potential income opportunities because their patrons are spending too much time waiting in lines.

Another problem within theme parks is that random patron traffic does not distribute patrons evenly amongst the attractions. Consequently, heavily advertised, new or novelty attractions tend toward heavier demand, while other attractions may Operate with little traffic. Currently, management of patron traffic in a theme park is attempted through the geographic placement of various attractions. However, after the patron is admitted to the theme park, traffic management is passive and relies entirely on the preferences of the patrons as the patrons migrate freely throughout the park. This results in uneven demand on all attractions, long queue lines and often extensive waiting periods for patrons.

In the past in order to avoid waiting lines, there have been instituted reservation systems. A reservation system, by definition, does not cause a waiting line and cannot manage the waiting period resulting from excess demand. However, with a simple reservation system, what does occur is that people may not show up for the reservation and instead of the attraction operating at full capacity, the attraction operates far below full capacity. For this reason a simple reservation system has in the past proven to be ineffective.

SUMMARY OF THE INVENTION

The waiting line management system of the present invention is where certain patrons within a theme park have been issued a special access device, such as a card or electronic identification device, which that patron may use in conjunction with computer access terminals located in a plurality of different locations within the theme park to select available time slots for a particular attraction. These computer access terminals are used to select a period of time when the patron may enter the attraction and utilize the attraction precluding the patron from having to wait in line for an extended period of time. The waiting line management system of the present invention reduces the waiting time for certain patrons, and also functions to evenly distribute demand over the various multiple attractions within the theme park. The patrons that have the access card are able to select access times for various attractions, and are able to confirm at any time existing selections, communicate with other access card holders within the theme park, change previous selections, summon emergency aid, and pay for other services without the use of cash. During the selected time slot for the particular attraction, the patron may attend the attraction and use the card to gain access through turnstiles equipped with an appropriate card reader and clock which will permit the patron entrance into a specifically designated area. The patron then passes through an access gate to utilize the attraction. This access gate merges with other non-card holding park patrons waiting to use the attraction. Card holders have the advantage of waiting a substantially diminished amount of time in a waiting line as compared to the non-card holding patrons.

The primary objective of the present invention is to offer patrons within a theme park the advantage of avoiding extended waiting in lines in order to utilize a particular attraction.

Another objective of the present invention is to provide other services to patrons including communications, cashless monetary transactions within the park, emergency services, restaurant reservation services, and similar types of services.

An additional objective of the present invention is to enable theme park operators to more evenly distribute patrons over the entire geographic area of the theme park by influencing the number and type of selections offered to patrons according to various capacities and current demands.

Another objective of the present invention is to enable theme park operators to track the movement of patrons through the facilities and acquire historical information on preferences and other characteristic patterns of patrons.

DETAILED DESCRIPTION OF THE PREFERRED EMBODIMENT

Figure 2:
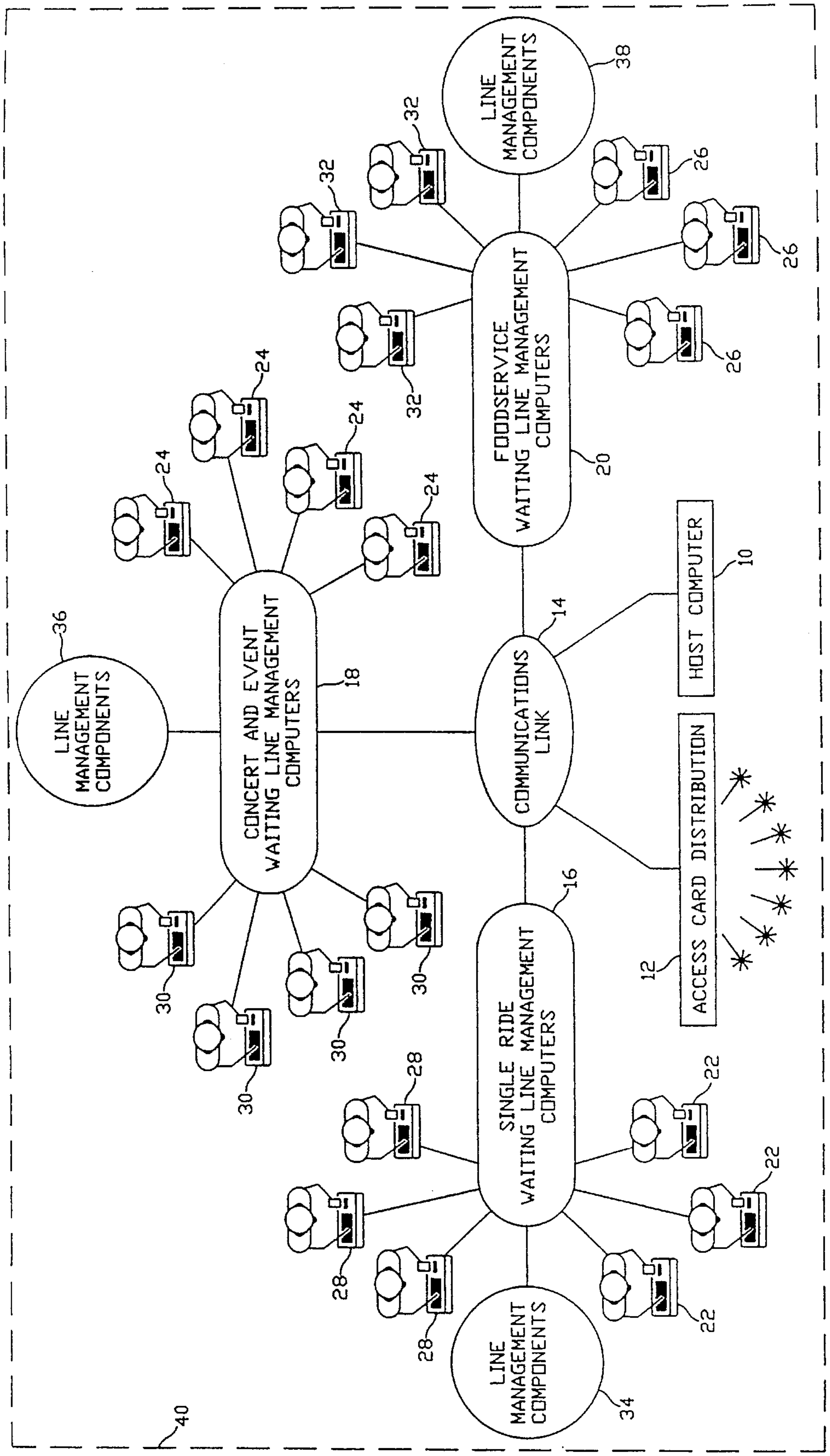
FIG. 2 is an organizational chart of the waiting line management system of the present invention within a typical theme park.

Referring particularly to FIG. 2 of the drawings, there is shown a host computer 10 which is a central control for all functions. This host computer 10 receives information from a plurality of card outlets represented generally as access card distribution 12 in FIG. 2. This access card distribution 12 distributes and then reports the issuance of the cards to the host computer 10. The reporting would be in the form of the identification number on the card and what services the patron is entitled to. In other words, some patrons may be entitled to more services than others. The host computer 10 is connected to a communications link 14 which transmits information to and from a plurality of attractions which have a single ride waiting line management computer 16, a plurality of concert and event waiting line management computers 18 and a plurality of food service waiting line management computers 20. The communications link 14 could be comprised of wires, fiber optics, radio transmitters and receivers or a combination of all of these.

Waiting line management computers 16, 18 and 20 are typical single activity representations of a plurality of applications which would be individually represented as specific rides, event or food service outlets, respectively. Each single ride waiting line management computer 16, each concert and event waiting line management computer 18, and each food service waiting line management computer 20 are each linked respectively to a plurality of card satellite terminals 22, 24 and 26 and a plurality of card line terminals 28, 30 and 32. The card satellite terminals 22, 24 and 26 are located within the theme park 40 but not in the waiting line area of a specific ride, event or food service outlet. The card line terminals 28, 30 and 32 are located within the theme park and are placed inside the waiting line area of a specific ride, event or food service outlet. These terminals 22, 24, 26, 28, 30 and 32 exchange data with each other and the host computer 10 by means of the communications link 14. Each single ride waiting line management computer 16, each concert and event waiting line management computer 18, and each food service waiting line management computer 20 has respectively connected to it waiting line management components 34, 36 and 38 which monitor and control the access to attractions of the patrons within the theme park 40.

Figure 4:
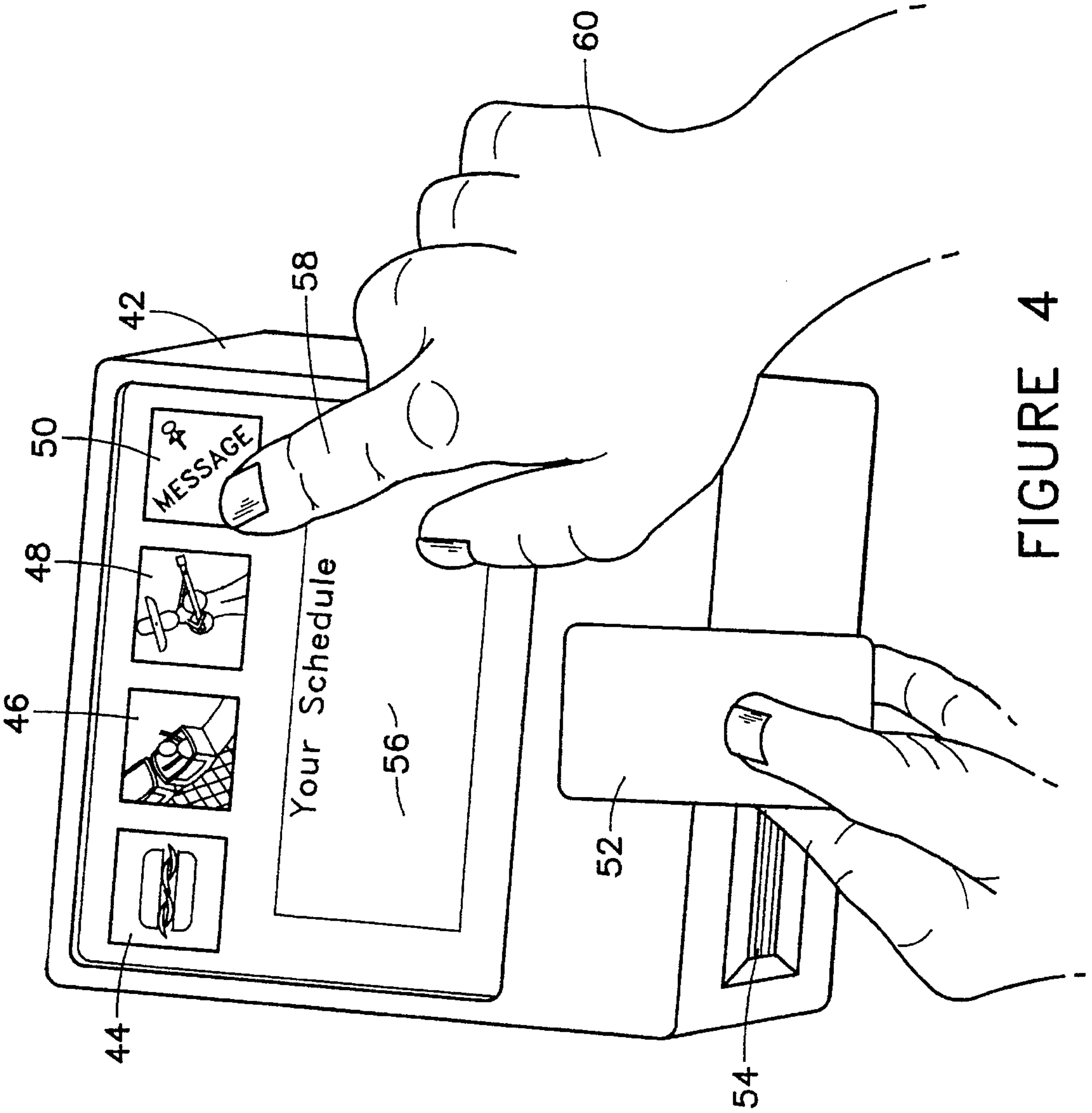
FIG. 4 is an isometric view of a typical computer access terminal that will be located at multiple locations within the theme park and used by the patrons.

FIG. 4 is a representation of a computer access terminal 42 that could be used for the card satellite terminals 22, 24 and 26 and also the card line terminals 28, 30 and 32. It is the function of the computer access terminal 42 to make selections from a menu of options with such menu of options being shown generally as graphic icons 44, 46, 48 and 50 on the terminal screen. For example, the graphic icon 44 could be used to denote food service items with graphic icon 46 to denote rides. Graphic icon 48 could be used to denote events and graphic icon 50 to be utilized to communicate with other card holding patrons.

After the patron has acquired a card from access card distribution 12, the patron can proceed to any one of a plurality of card access terminals 22, 24, 26, 28, 30 and 32 located throughout the theme park 40. The patron inserts their card 52 into a card reader 54 contained within the computer access terminal 42. The card is then read by the card reader 54 and if the patron has selected graphic icon 46, card verification and ride time availability is requested of the single ride waiting line management computer 16 which in turn requests verification from the host computer 10. Upon verifying the authenticity of the card 52, the host computer 10 relays time availability information to the terminal 42. Upon the patron having selected a particular ride and a time to utilize the ride, that information is then displayed on display screen 56 of the terminal 42. Also displayed on the display screen 56 may be selections or other menu items that are available to the patron. Once the patron has made the desired selections in relation to the graphic icon 46, that is, selecting the time slots that the patron will be present at each particular ride, the patron then may select the food service outlets by pressing graphic icon 44 or concerts and events by pressing graphic icon 48 or other services such as leaving a message by pressing graphic icon 50. The leaving of the messages on graphic icon 50 will be by selecting from a menu of different written phrases to make sentences without the use of a keyboard on the card access terminals 22, 24, 26, 28, 30 and 32. The message would reference the card holder that is to get the message and once that card holder places his or her card 52 within a computer access terminal 42, his or her attention would be called to that message. A card holder can cancel or change a time slot window by using any one of the computer access terminals 42.

Upon arriving at an attraction, a card holder 62 presents his or her card to the card line entry reader and clock 64 within the scheduled time slot as confirmed by the card line entry reader 64. If the card is inserted in the card line entry reader 64 within the scheduled time slot, access is permitted to the card line 66 through the card line entry turnstile 68 or alternately access is denied if it is later or earlier than the scheduled time slot window. If a card holder 82 arrives after his or her time slot window and access is denied, the waiting line management computer 16 then releases that space or place to a non-card holding patron 72 located in the non-card line 70. Upon gaining access to the card line 66, the card holder now has a fixed period of time, determined by the cycle time of the ride, before which he or she will be permitted access to the next cycle of the ride. The card holder 62 may access in-line card terminals 28 and add or modify scheduled time slot windows or make use of other card terminal services while awaiting access to the next cycle of the ride.

A typical card line 66 is never allowed to fill completely. If the ride cycle times perform more slowly than predicted by the waiting line management computer 16, the card line 66 would begin to grow in size. When this occurs, the waiting line management computer 16 modifies the ratio of card patrons 62 to non-card patrons 72 who are allowed access to the ride until the card line 62 is reduced to normal size. Upon proceeding through the card line 66, a typical card holder 62 proceeds to the card access gate 74. When the green access light 94 on the access light console 76 flashes to indicate that a new ride cycle is beginning, the card holder 62 then presents his or her card 52 to be read by the access gate reader 78. If the card inserted in the access gate card reader 78 has a valid reserved time slot, gate 74 will permit access to the area 80. To provide security features against a non-card patron 72 and line jumpers, the card reader 78 will not recognize the patron and the light console alerts the operator 84 of an invalid card in the card line 66 with an audible alert and flashing red light sequence. The offender can be ejected from the park or be notified of their violation. A confirmed card holder 62 proceeds through the gate 74 to the area 80 and boards the ride and a new cycle begins.

Based on the capacity of each individual attraction, the park management using the host computer 10 can allocate in each of the respective cycle times a variable percentage of spaces or places that are made available for selection by a card holder 62. The percentage of each cycle spaces or places that are offered as available time slots for card holders 62 varies with the number of patrons in the park who have cards 52 versus the non-card holders 72 present. Typical non-card holders 72 enter the separate non-card line 70 through the non-card turnstile 86 which reports to the ride waiting line management computer 16 the count of non-card holders 72 proceeding to the access area of the attraction. The non-card line digital clock 88 also displays the estimated number of minutes that a non-card holder 72 will need to wait before being permitted access to the ride as calculated by the waiting line management computer 16. Typical non-card holders 72 access the boarding area through the non-card line access gate 90 which is actuated by the waiting line management computer 16 and when cued to proceed by the non-card gate access indicator lights 92. All spaces or places on a specific ride are available to non-card patrons 72 except those places which have been selected by a card holder 62 and that selection has also been confirmed by the card holder 62 after having their card read by the card line entry reader 64 during their scheduled time slot. Time slots that have not been selected by card holder 62 or time slots where card holders 82 did not have their card read during their scheduled window, are released by the waiting line management computer 16 to non-card holders 72 waiting at the non-card line access gate 90.

Waiting line management computers 16, 18 and 20 have installed therein a data base comprised of the mechanical capacities of their respective attraction within the theme park 40. The mechanical capacity of each unit is their respective manufacturers computation of the number of persons that can be serviced within one hour based on a defined mechanical specification or architectural design. This number is used as the base number in the host computer 10 when operating the theme park 40 on a going concern basis. A predictive model is generated through a computation applied by each waiting line management computers 16, 18 and 20 which incorporates the known mechanical capacity of the theme park 40 based on the specification and design and the data acquired by sampling the actual operation throughputs reported by the access gates 74 and 90 and the current demand is reported by the line entry turnstiles 68 and 86. The waiting line management computers 16, 18 and 20 construct a predictive model forecasting the anticipated cycle times of each attraction and the total time slots or openings that are available for both card holders 62 and non-card holders 72. This data is relayed on a current basis by the waiting line management computers 16, 18 and 20 to the host computer 10.

A computation using control inputs from management and the number of card holders 62 currently in the theme park 40 is performed to derive a percentage of the total available spaces or places in a predicted cycle of each individual attraction. This percentage of spaces or places is allocated and offered, as the available time slot windows, to card holders 62 within the theme park 40. Each individual attraction may have varied percentage of allocations of time slot windows for card holders 62. Each card time slot window is a fixed period of time comprised of a consecutive number of minutes within which period the card holder 62 can access the card line entry turnstile 68. These time slot windows are presented for selection by a card holder 62 on card access terminals 22, 24, 26, 28, 30 and 32. The available time slot window issued to a card holder 62 anticipates that the card holder 62 will use the typical access gate 74 to utilize the ride, attraction, event, concert or food service site at the beginning of the first cycle following the cycle in which the card patron 62 passes through the card line entry turnstile 68. Through a computation of data resulting from the predicted cycled times, confirmed card line holder 62, as reported by the card line entry turnstile 68 and access gate 64, and non-card line holder 72 as reported by non-card line entry turnstile 86 and non-card line access gate 90, the non-card digital clock 88 displays the approximate number of minutes of waiting time predicted for non-card holders 72 entering the turnstile 86 until passing through access gate 90.

Through certain inputs that may be determined from time to time by a theme park operators, the host computer 10 can vary or alter with each attraction, the percentage of the total available spaces or places that are allocated for use by card holders 62, can offer selections to card holders 62 that give priority to one selection versus another, or can offer selections to card holders 62 in a manner so as to cause card holders 62 to geographically distribute within the theme park 40 in a controlled manner. Depending upon the application, waiting line management components 34, 36 and 38 may contain different elements than those represented herein for this application. Further, different applications may combine the functions provided by the computer access terminals 22, 24, 26, 28, 30 and 32 and the access means into a single unit carried by a patron. The line management components 34, 36 and 38 comprise the following items for each of the waiting line computers 16, 18 and 20: card readers 64 and 78, turnstiles 68 and 86, non-card line digital clock 88, gates 74 and 90, access light console 76, non-card gate access indicator lights 92 and card gate access indicator lights 94.

Communications link 14 is a hub through which information is relayed to and from computer access terminals 22, 24, 26, 28, 30 and 32. This data is relayed to and from the host computer 10 by way of waiting line management computers 16, 18 and 20. The host computer 10 executes theme park management functions and is linked to a plurality of waiting line management computers 16, 18 and 20. should the communications link fail, all waiting line management computers 16, 18 and 20 maintain the ability to allot access times through the use of their associated computer access terminals 22, 24, 26, 28, 30 and 32 by card holders. Should any waiting line management computer 16, 18 or 20 fail, access to all other attractions shall not be affected. The access card distribution 12 represents a plurality of locations where patrons can acquire the cards 52. Each of these locations is linked to the host computer 10 through the communications link 14.

Figure 1:
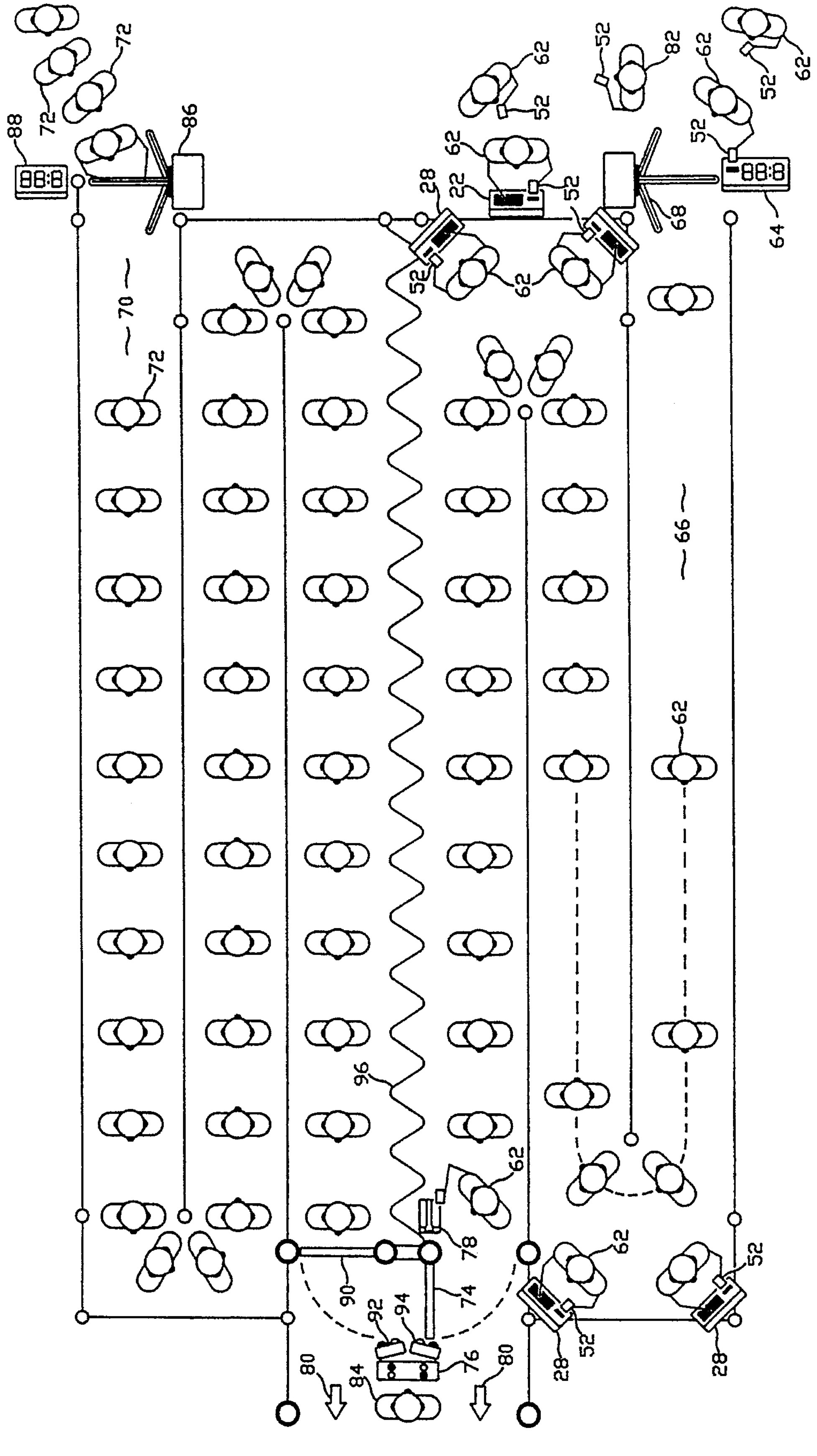
FIG. 1 is a top plan schematic view of a typical single attraction line within which has been incorporated the waiting line management system of the present invention.
Figure 3:
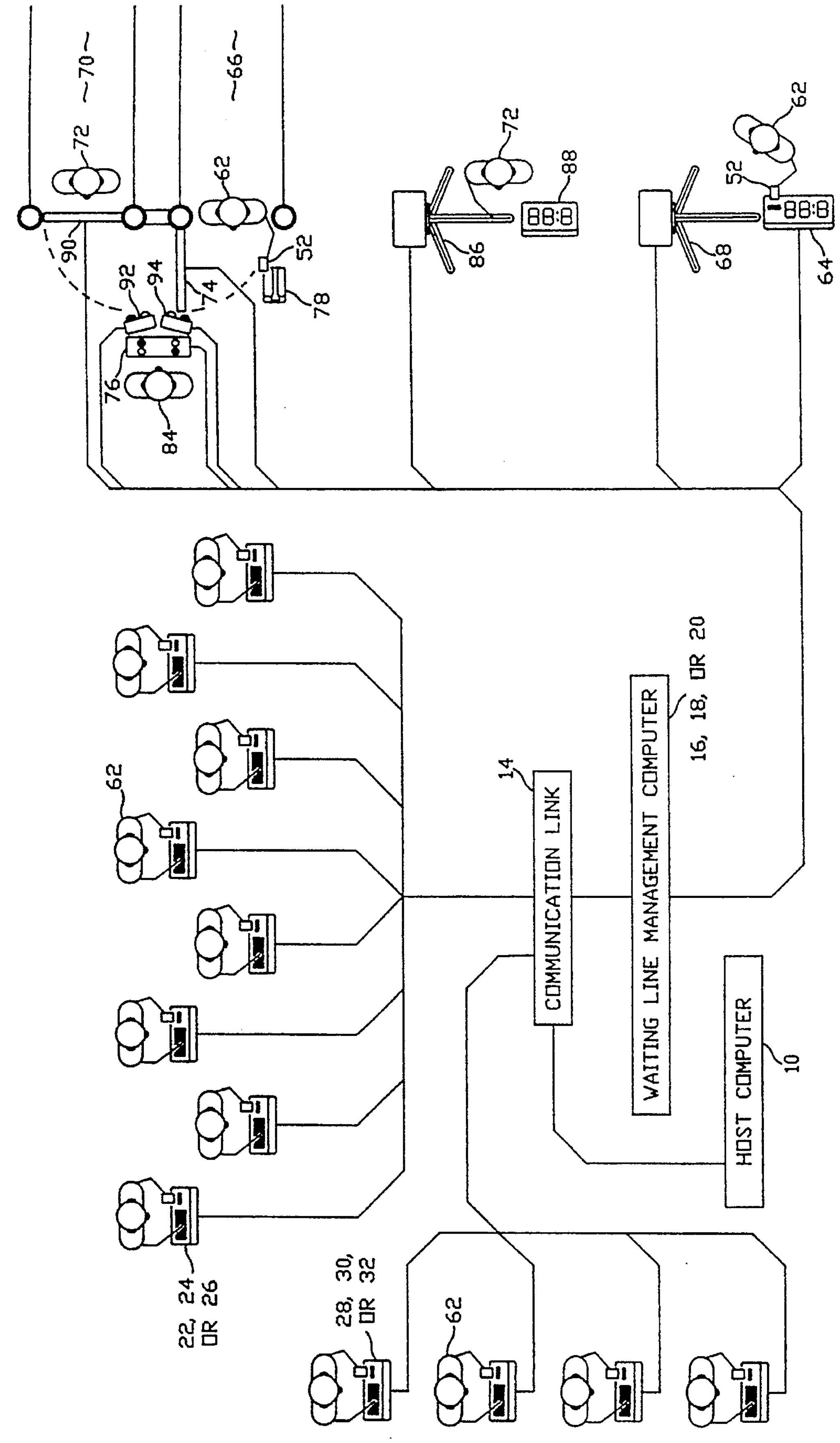
FIG. 3 is a top plan schematic view of a typical single attraction line showing all the management components which are used in relation to a single attraction.

Referring particularly to FIG. 3, it is to be understood that the turnstile 86 is to supply the,non-card holders 72 in the line 70 through turnstile 90 to gain access to a particular attraction. In a similar manner, the card holders 62 are to be conducted through turnstile 68 into line 66 and through the access gate 74 into the particular attraction. When comparing FIG. 3 to FIG. 1, the actual lines in total length have been omitted in FIG. 3 which are representatively shown in FIG. 1. The separation of the card holder line 66 from the non-card line 70 is obtained by a physical barrier 96.

What is claimed is:

1. In combination with a business establishment that has a plurality of separate attractions, each said attraction having a fixed usage capacity of customers per unit of time which said attraction can accommodate, the number of customers located within said business establishment exceeding said fixed usage capacity, a waiting line management system for customers to avail themselves of said attractions comprising:

means for establishing at each said attraction two separate waiting lines comprising a first waiting line and a second waiting line for queuing customers, said first waiting line not requiring reservations, said second waiting line requiring reservations, said second waiting line supplying preferential treatment for the customers to avail themselves of its respective said attraction;

at least one computer access terminal in conjunction with said business establishment, said computer access terminal having a display means for displaying a selectable menus of attractions and its associated time schedule, and recording means for recording customers selected attractions and its associated time schedule;

a plurality of access means usable in conjunction with said computer access terminals, each customer carrying his or her own access means, upon a customer connecting his or her own access means to said computer access terminal the customer being able to place selections according to time so as to schedule access to utilize said second waiting line at each said attraction thereby avoiding said first waiting line; and each said second waiting line including a control means, activation of said control means being required for a customer to be placed within said second waiting line, activation of said control means being obtained by connection with said access means during an appropriate time slot that has been preselected by the customer.

2. The combination as defined in claim 1 wherein:

there being a plurality of computer access terminals located in a spaced apart arrangement within said business establishment.

3. The combination as defined in claim 1 wherein:

said access means comprising a card.

4. The combination as defined in claim 1 wherein:

the total number of said selections within said business establishment being obtained by means of a preestablished allotment.

5. The combination as defined in claim 1 wherein:

said access means include a cashless monetary system for payment for goods and services.

6. The computer access terminal as defined in claim 5 wherein:

said computer access terminals permitting direct message communication between human users.

* * * * *